United States Patent
Aioanei

(10) Patent No.: US 7,385,379 B2
(45) Date of Patent: Jun. 10, 2008

(54) NO LOAD TO HIGH LOAD RECOVERY TIME IN ULTRAPORTABLE DC-DC CONVERTERS

(75) Inventor: Ovidiu C. Aioanei, San Jose, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 56 days.

(21) Appl. No.: 10/793,960

(22) Filed: Mar. 4, 2004

(65) Prior Publication Data
US 2004/0257055 A1  Dec. 23, 2004

Related U.S. Application Data

(60) Provisional application No. 60/452,808, filed on Mar. 6, 2003.

(51) Int. Cl.
*G05F 1/00* (2006.01)
(52) U.S. Cl. .................. 323/284; 323/282; 323/285
(58) Field of Classification Search ............ 323/284, 323/285, 282, 283, 351
See application file for complete search history.

(56) References Cited

U.S. PATENT DOCUMENTS

| | | | | |
|---|---|---|---|---|
| 5,568,044 A * | 10/1996 | Bittner | .................. | 323/272 |
| 5,617,016 A * | 4/1997 | Borghi et al. | ................ | 323/284 |
| 5,889,392 A * | 3/1999 | Moore et al. | ................ | 323/282 |
| 5,939,871 A * | 8/1999 | Tanaka | ...................... | 323/285 |
| 6,215,288 B1 * | 4/2001 | Ramsey et al. | ............ | 323/224 |
| 6,246,555 B1 * | 6/2001 | Tham | .......................... | 361/18 |
| 6,329,801 B1 * | 12/2001 | Zuniga et al. | .............. | 323/285 |
| 6,344,980 B1 * | 2/2002 | Hwang et al. | ............ | 363/21.01 |
| 6,396,252 B1 * | 5/2002 | Culpepper et al. | .......... | 323/285 |
| 6,433,525 B2 * | 8/2002 | Muratov et al. | ............ | 323/282 |
| 6,696,882 B1 * | 2/2004 | Markowski et al. | ........ | 327/531 |
| 6,801,024 B2 * | 10/2004 | Bernardon | .................. | 323/224 |
| 7,034,513 B2 * | 4/2006 | Gan et al. | .................... | 323/285 |
| 7,071,665 B2 * | 7/2006 | Tzeng et al. | ................. | 323/282 |
| 7,173,404 B2 * | 2/2007 | Wu | ............................ | 323/283 |

* cited by examiner

Primary Examiner—Jeffrey Sterrett
Assistant Examiner—Harry Behm
(74) Attorney, Agent, or Firm—Sidley Austin LLP

(57) ABSTRACT

A voltage converter that recovers quickly from a transition from a power save mode where the load is relatively low to a fully operation mode where the load is relatively high. The converter utilizes circuitry that is not dependent upon the slew rate of an amplifier in recovering from the transition. When the transition is sensed high current is applied for a short duration to increase the output voltage rapidly and thereby shorten the transition time from power save mode to fully operational mode.

20 Claims, 3 Drawing Sheets

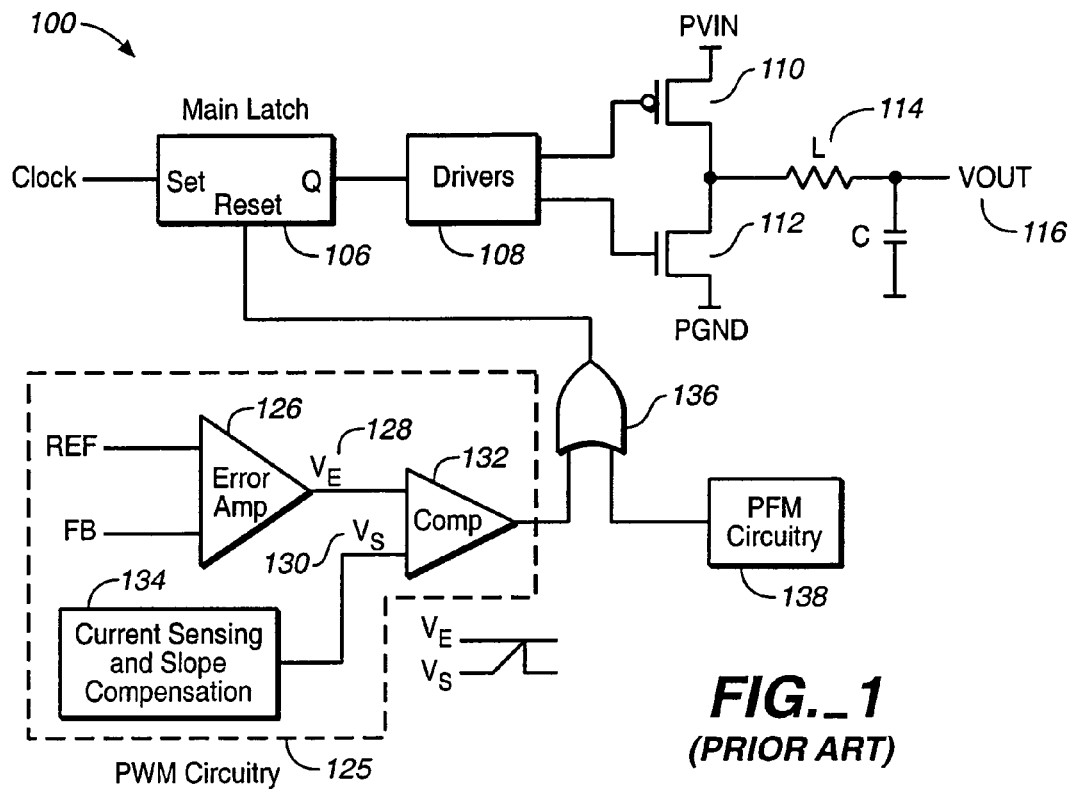
FIG._1
*(PRIOR ART)*
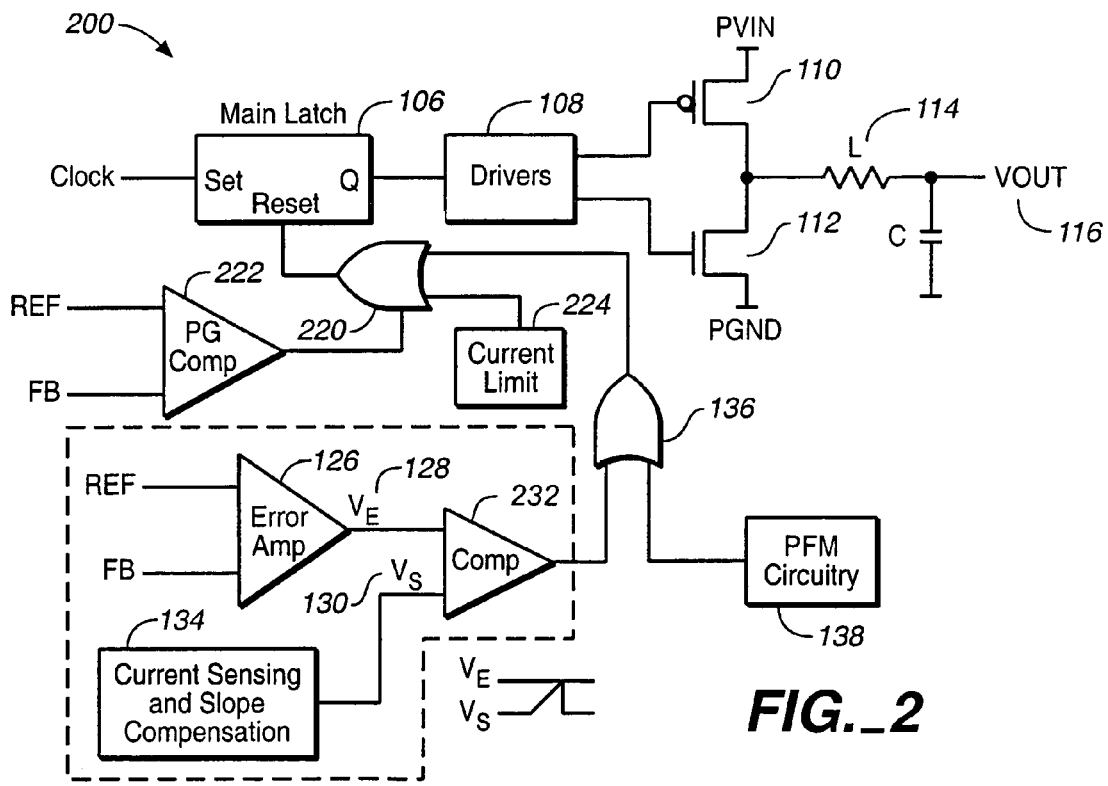
FIG._2

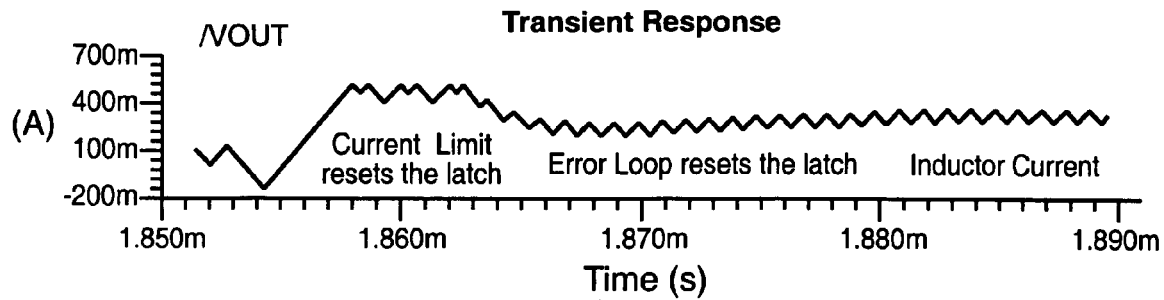
FIG._3A
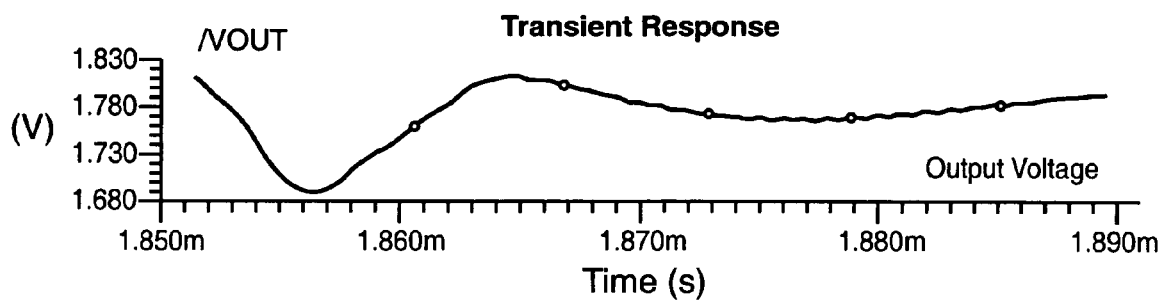
FIG._3B
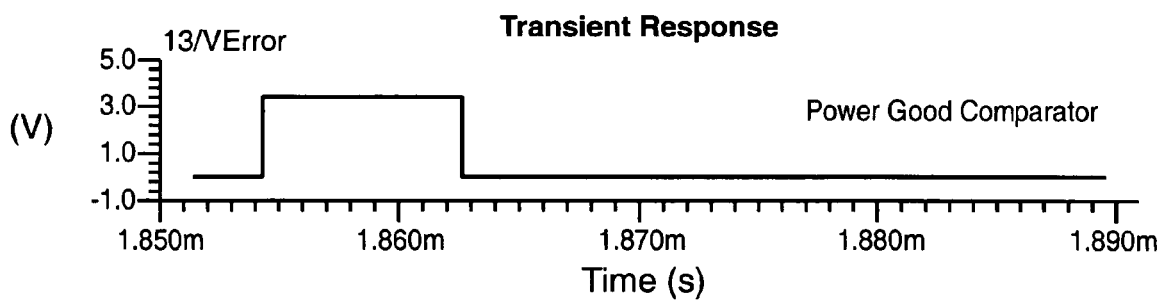
FIG._3C
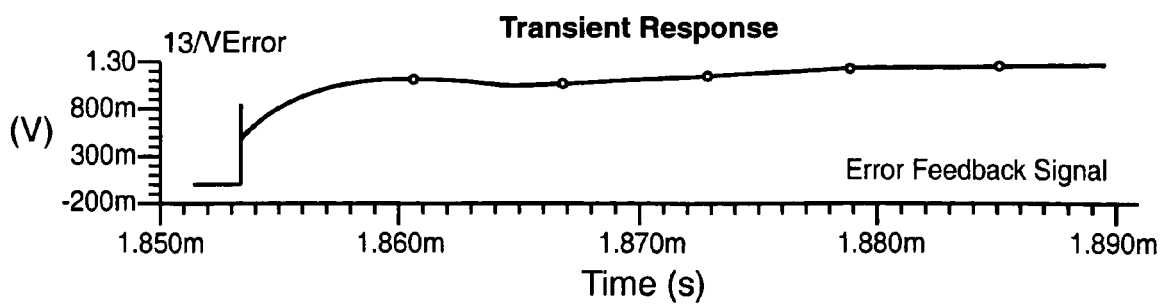

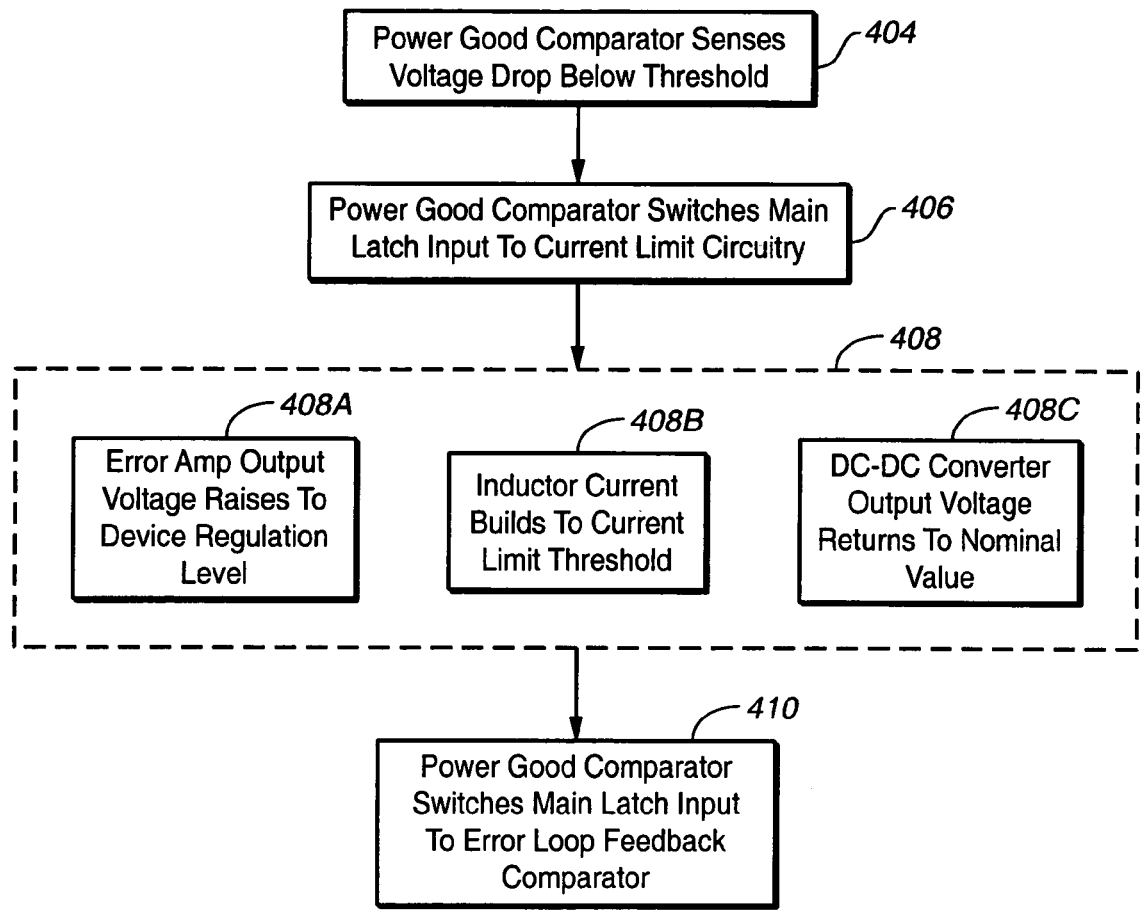
FIG._4

NO LOAD TO HIGH LOAD RECOVERY TIME IN ULTRAPORTABLE DC-DC CONVERTERS

CROSS-REFERENCE TO RELATED APPLICATION AND CLAIM OF PRIORITY

The present application claims the benefit of priority to U.S. Provisional Patent Application Serial No. 60/452,808, filed on Mar. 6, 2003, entitled "No Load To High Load Recovery Time In Ultraportable DC-DC Converters," the entirety of which is incorporated by reference herein.

BACKGROUND OF THE INVENTION

1. Field of the Invention

The present invention relates generally to the power supply circuitry of battery powered devices in which low power consumption is critical.

2. Related Art

In many battery powered devices there exists a power saving mode that a device may enter in order to save power and extend battery life. This is especially important in devices such as cellular phones. In order to maximize battery life, the devices must have very low power consumption. At the same time, the devices must quickly respond to input from a user.

DC-DC converters are a part of a larger power supply circuitry. The latest DC-DC Converters drain about 15 uA from the battery while operating in the power save or "No Load Current" mode. This power save mode is also referred to as Pulse Frequency Modulation ("PFM") mode or pulse skipping mode, whereas the device would otherwise be in operating mode, which employs Pulse Width Modulation ("PWM"). In the power save mode of many current devices, low or quiescent current usage is achievable by turning off all of the building blocks except the reference voltage and two comparators when the converter is skipping pulses.

In the operating mode, the DC-DC converter must regulate the output voltage at high load current. While in the operating mode the device operates at a fixed switching frequency and the regulation is achieved using error loop feedback. The recovery time to a high load current of the operating mode from the low current power save mode depends on the error loop setting time from the power save state and on the slew rate of the error amplifier.

FIG. 1 shows the block diagram of a prior art current-mode step-down DC-DC converter.

The PFM circuitry 138 resets the latch 106 during power save mode. In PWM mode the latch is being reset by the error loop feedback from PWM circuitry 125 comprising error amp 126, comparator 132 and current sensing and slope compensation circuitry block 134. The error amp 126 produces a voltage $V_E$ and the current sensing and slope compensation circuitry block 134 produces a voltage $V_s$, both of which are inputs to comparator 132. Latch 106 drives transistors 110 and 112 via drivers 108. Inductor 114 is directly or indirectly coupled to the output of transistors 110 and 112 and to a Voltage output 116.

The PFM circuitry 138 resets the latch during the power save (or Pulse Skipping) mode. In PWM mode the latch is being reset by the error loop feedback of PWM circuitry 125. The converter switches automatically between the two modes of operation. The switching is accomplished by the 'OR' gate 136 in FIG. 1.

In PWM circuitry 125, the output voltage level $V_E$ of error amp 126 changes with the load current and input voltage. The 'Current sensing and Slope Compensation' block 134 provides a voltage ramp proportional to the inductor current. The comparator 132 compares the voltage ramp ($V_s$) to the error signal ($V_E$) and resets the flip-flop.

In the PWM mode operation, the converter 100 operates at a fixed frequency while controlling the duty cycle of transistor 110. At the beginning of each clock cycle, transistor 110, which is preferably but not necessarily a P-channel type transistor, is turned on. The current in inductor 114 ramps up and is sensed via the Current Sensing and Slope Compensation circuitry block 134. Transistor 110 is turned off when the sensed current causes the PWM comparator 132 to trip (as seen in the little graph in FIG. 1). After a minimum dead time preventing shoot through current, transistor 112, which is preferably but not necessarily an N-channel type transistor, will be turned on and the inductor current ramps down. As the clock cycle is completed, transistor 112 will be turned off and the next clock cycle starts.

While in power saving or pulse skipping mode, the PWM circuitry 125 including error amplifier 126 is turned off to save power and its output voltage is zero. When a high current load transition takes place the error amplifier is turned on and its output voltage rises to the regulation level. The converter 100 runs with a low duty cycle until the output voltage 116 regulation level is reached and the recovery time is a function of the error amplifier 126 slew rate. Because the recovery time depends on the slew rate in these prior devices, the recovery takes a relatively long time. In the prior art example shown in FIG. 1, the recovery time is on the order of 50 to 70 microseconds or longer. This recovery time is significant and is an undesirable quality of prior converters.

SUMMARY

The voltage converter of the present invention quickly recovers from a transition from a (no or low) load associated with a power save mode to a (high) load associated with normal operational mode. This results a device with very long battery life, yet negligible delays in operation when the device transitions into operational mode.

One aspect of the invention is a method that involves varying the duty cycle of an output transistor to convert an input voltage to the output voltage, and sensing a transition from a low load to a high load, and in response providing a high current level until a current limit is detected, such that after the current limit is detected the duty cycle is again varied with the output transistor.

Another aspect of the invention is a voltage converter comprising a normal operating mode and a power saving mode. The converter switches between the power saving mode and the normal operating mode in such a way that it is not dependent upon the slew rate of an amplifier. The present invention recovers much faster than those prior devices with recovery times dependent upon the slew rate of an amplifier.

BRIEF DESCRIPTION OF THE DRAWINGS

FIG. 1 is a schematic of a prior art current-mode step-down DC-DC converter 100.

FIG. 2 is a schematic of a DC-DC converter 200 embodying the present invention.

FIG. 3A is a graph of the inductor current.

FIG. 3B is a graph of the output voltage (VOUT) of the converter seen in FIG. 2.

FIG. 3C is a graph of the voltage signal produced by the Power Good Comparator seen in FIG. 2.

FIG. 3D is a graph of the error feedback signal $V_E$ from the error amplifier seen in FIG. 2.

FIG. 4 is a flowchart of the transition from power save mode to normal operation of a device.

Like numbers are used to describe like components throughout the Background and Detailed Description.

DETAILED DESCRIPTION

The recovery time of a converter embodying the present invention is not slew rate dependent like prior art devices such as that shown in FIG. 1. Therefore, the recovery time from power save mode to operating mode is greatly minimized according to the present invention.

FIG. 2 is a schematic of a DC-DC converter embodying the present invention, and FIGS. 3A-3D are graphs illustrating the operation of the DC-DC converter shown in FIG. 2. The numbering used in FIG. 1 is continued on in FIG. 2 and for a description of operation of those like numbered components please refer to the description of FIG. 1.

FIG. 4 illustrates the main steps involved in "recovery," the process of switching from power save mode to normal operating mode.

A "power good" comparator 222 senses when the converter 200's output voltage 116 drops below a threshold (due to a high current load transition) and switches the reset input of the main latch 106 to the output of the current limit circuitry 224 with gate 220. The current limit circuitry produces a current level that is sufficient to quickly produce a "predetermined" current limit as measured at inductor 114 and therefore trip the latch 106. This is much faster than waiting for the error amplifier 126 output voltage $V_E$ 128 to recover to the level necessary to produce a given desired output voltage 116. This current level is dependent upon the selection of the inductor 114. In other words, different implementations of the circuitry will have different current limits depending upon, among other things, the desired output voltage range and the selection of the circuit components, including the inductor.

While the error amplifier 126 output voltage $V_E$ 128 rises to the necessary level for regulation, the inductor 114 current is allowed to build up to the current limit threshold. As a result, the DC-DC converter 200's output voltage 216 recovers quickly to the nominal value and the power good comparator 222 switches back the reset input of the main latch 106 to the error loop feedback comparator 232.

When the power good comparator 222 output is high a comparator (not shown) in the current limit circuitry 224 allows the inductor 114 current to build up quickly to the maximum value, resetting the main latch 106. The converter's output voltage 116 reaches the regulation level (power good comparator 222 output goes low) and the main latch 106 is reset by the error loop feedback. The DC-DC converter 200 then runs (switches transistor 110) with the normal duty cycle given by the ratio between the output and the input voltage.

In FIG. 3D one can see the sharp change in the error feedback signal indicating the switch from power save mode to normal operating mode (from low load to high load). This is done in response to sensing a drop in the output voltage as seen in FIG. 3B. When the power good comparator signal goes high, the current limit circuitry 224 resets the latch. This can be seen in the sharp rise in current in FIG. 3A that begins at the same instant the leading edge of the power good comparator signal goes high in FIG. 3C. After reaching the current limit (while the current limit is circuitry is resetting the latch) of about 500 milliamps in this illustrative embodiment for some period of time, the PWM circuitry 125 (error loop) resets the latch. This results in a much shorter transition than in the prior art which depended upon recovery of the error feedback signal shown in FIG. 3D. This is because the slew rate of the error amp 126 is quite slow, as can be seen in FIG. 3D.

The operation described above with regards to FIGS. 3A-D is summarized in the flowchart of FIG. 4. In step 404, the power good comparator 222 senses that the desired output voltage 116 drops below a threshold regulation level. Next, in step 406, the power good comparator 222 switches the main latch 106 so that he current limit circuitry controls the main latch rather than the PWM circuitry 125. After that, in step 408, the current limit circuitry 224 sends a high current level through transistor 112 until the current limit is reached, as seen in FIG. 3A. This is also represented by box 408B. While this is happening, the error amp output $V_E$ rises to the necessary level for proper regulation as represented by box 408A. The converter 200 output voltage 116 returns to the desired nominal value, as represented by box 408C. As seen in step 410, the power good comparator switches the latch input to the error loop feedback comparator 132 of PWM circuitry 125.

This improved DC-DC converter and method of switching a device from power save mode to operating mode, drastically reduces the time required for a device to recover from power save mode. Whereas the prior design shown in FIG. 1 required about 50-70 microseconds or more to recover, the embodiment of the present invention shown in FIGS. 2-4 requires only about 20 microseconds for recovery. This fast recovery time is crucial in providing apparently seamless operation of battery powered devices. With such a short recovery time, the user of the device will likely not even be aware that the device has transitioned from power save mode to normal operating mode.

What is claimed is:

1. A method of operating a voltage converter that produces an output voltage, the method comprising:
controlling the voltage converter with a pulse frequency modulation circuitry during a low load condition;

controlling the voltage converter with a pulse width modulation circuitry during a high load condition;

detecting a transition from the low load condition to the high load condition, the transition marked by the output voltage dropping below a voltage threshold value; and in response to the detection of the transition from the low load condition to the high load condition, controlling the voltage converter with a current limit circuitry to provide a sufficiently high current to allow an inductor current to reach a current limit threshold, thereby returning the output voltage to a level equal to or greater than the voltage threshold value, wherein the current limit circuitry is distinct from the pulse frequency modulation circuitry and the pulse width modulation circuitry.

2. The method of claim 1 wherein detecting comprises comparing the output voltage to a reference voltage.

3. A voltage converter that converts an input voltage into an output voltage, comprising:

an output terminal at which the output voltage is provided;

a first output transistor and a second output transistor connected in a half-bridge arrangement and coupled to an inductor, wherein the inductor is coupled to the output terminal;

pulse frequency modulation circuitry for controlling the voltage converter during a low load condition;

pulse width modulation circuitry for controlling the voltage converter during a high load condition;

sensing circuitry that senses a transition from the low load condition to the high load condition; and current limit circuitry responsive to the detection of the transition from the low load condition to the high load condition, wherein the current limit circuitry is distinct from the pulse frequency modulation circuitry and the pulse width modulation circuitry, the current limit circuitry for controlling the voltage converter to provide current from the first output transistor to the inductor and output terminal, thereby minimizing a drop in the output voltage associated with the transition from the low load condition to the high load condition.

4. The voltage converter of claim 3 wherein the sensing circuitry comprises a comparator that compares the output voltage to a reference voltage.

5. The voltage converter of claim 3 wherein the transition from the low load to the higher load is marked by a drop in the output voltage to below a voltage threshold value.

6. The voltage converter of claim 5 wherein current limit circuitry maintains control of the voltage converter until the output voltage returns to a level equal to or greater than the voltage threshold value.

7. The voltage converter system of claim 5 wherein current limit circuitry maintains control of the voltage converter until the current flowing through the inductor reaches a predetermined current limit threshold.

8. A voltage converter that converts an input voltage into an output voltage, comprising:

an output terminal at which the output voltage is provided;

a first output transistor and a second output transistor connected in a half-bridge arrangement and coupled to an inductor, wherein the inductor is coupled to the output terminal;

pulse frequency modulation circuitry for controlling the voltage converter with a first form of modulation during a low load condition;

pulse width modulation circuitry for controlling the voltage converter during a high load condition;

sensing circuitry that senses a transition from the low load condition to the high load condition, the transition marked by the output voltage dropping below a voltage threshold value; and current limit circuitry responsive to the detection of the transition from the low load condition to the high load condition, wherein the current limit circuitry is distinct from the pulse frequency modulation circuitry and the pulse width modulation circuitry, the current limit circuitry for controlling the voltage converter to provide a sufficiently high current to allow a current flowing through the inductor to reach a current limit threshold, thereby returning the output voltage to a level equal to or greater than the voltage threshold value.

9. The voltage converter of claim 8 wherein the sensing circuitry comprises a comparator that compares the output voltage to a reference voltage.

10. The voltage converter system of claim 8 wherein the pulse width modulation circuitry comprises circuitry operable to sense the current flowing through the inductor.

11. The voltage converter system of claim 8 wherein the current limit circuitry maintains control of the voltage converter until the output voltage returns to a level equal to or greater than the voltage threshold value.

12. A voltage converter that converts an input voltage into an output voltage, comprising:

an output terminal at which the output voltage is provided;

a first output transistor and a second output transistor connected in a half-bridge arrangement and coupled to an inductor, wherein the inductor is coupled to the output terminal;

first modulation circuitry for controlling the voltage converter with a first form of modulation during a low load condition;

second modulation circuitry for controlling the voltage converter with a second form of modulation during a high load condition;

sensing circuitry that senses a transition from the low load condition to the high load condition, the transition marked by the output voltage dropping below a voltage threshold value; and current limit circuitry responsive to the detection of the transition from the low load condition to the high load condition, wherein the current limit circuitry is distinct from the pulse frequency modulation circuitry and the pulse width modulation circuitry, the current limit circuitry for controlling the voltage converter in to provide a sufficiently high current to allow a current flowing through the inductor to reach a current limit threshold, thereby returning the output voltage to a level equal to or greater than the voltage threshold value.

13. The voltage converter of claim 12 wherein the first form of modulation comprises pulse frequency modulation.

14. The voltage converter of claim 12 wherein the second form of modulation comprises pulse width modulation.

15. The voltage converter of claim 12 wherein the sensing circuitry comprises a comparator that compares the output voltage to a reference voltage.

16. The voltage converter system of claim 12 wherein the pulse width modulation circuitry comprises circuitry operable to sense the current flowing through the inductor.

17. The voltage converter system of claim 12 wherein the current limit circuitry maintains control of the voltage converter until the output voltage returns to a level equal to or greater than the voltage threshold value.

18. In a power converter system comprising a transistor operable to be turned on and off for causing current to flow through an inductor for providing an output voltage to a load, a method comprising:

controlling the power converter system with a first form of modulation circuitry during a low load condition;

controlling the power converter system with a second form of modulation circuitry during a high load condition;

detecting a transition from the low load condition to the high load condition, the transition marked by the output voltage dropping below a voltage threshold value; and in response to the detection of the transition from the low load condition to the high load condition, controlling the transistor with current limit circuitry so that current flowing through the inductor current reaches a current limit threshold, thereby returning the output voltage to a level equal to or greater than the voltage threshold value, wherein the current limit circuitry is distinct from the pulse frequency modulation circuitry and the pulse width modulation circuitry.

19. The method of claim 18 wherein the first form of modulation circuitry comprises pulse frequency modulation circuitry.

20. The method of claim 18 wherein the second form of modulation circuitry comprises pulse width modulation circuitry.

* * * * *